United States Patent Office 3,247,375
Patented Apr. 19, 1966

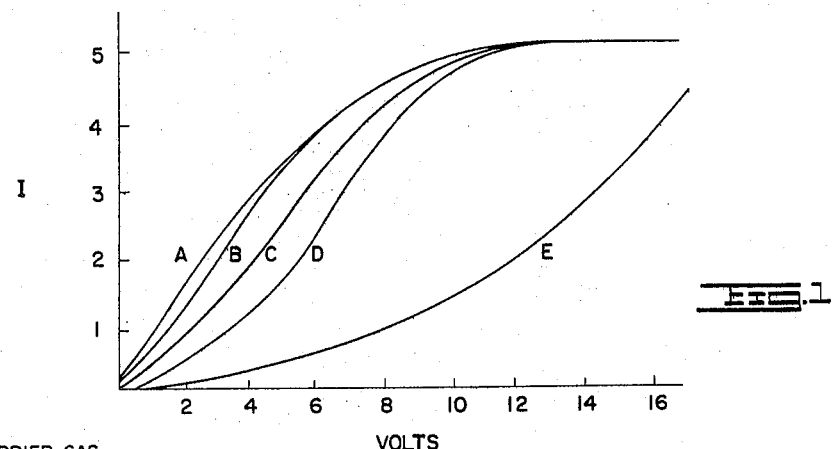
FIG. 1
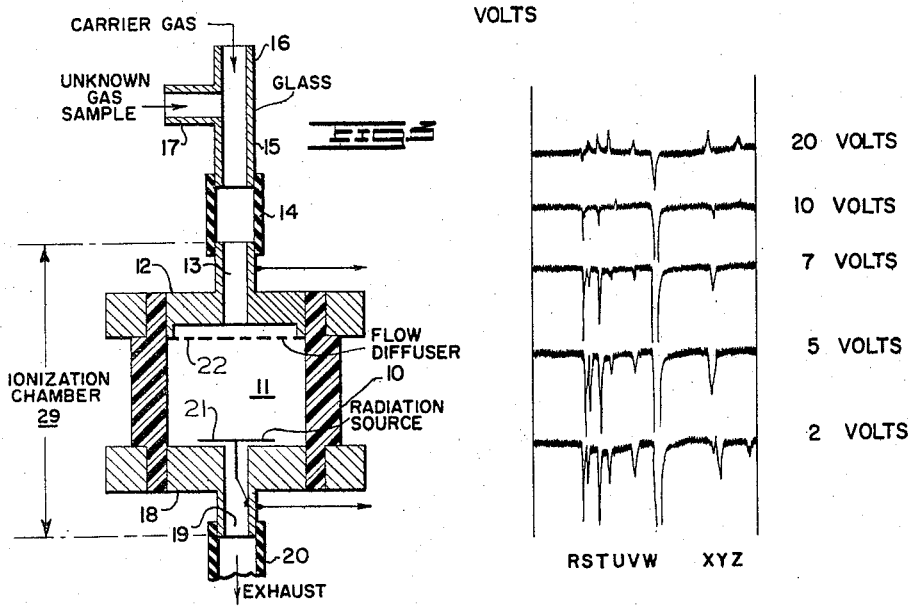
FIG. 2
FIG. 3
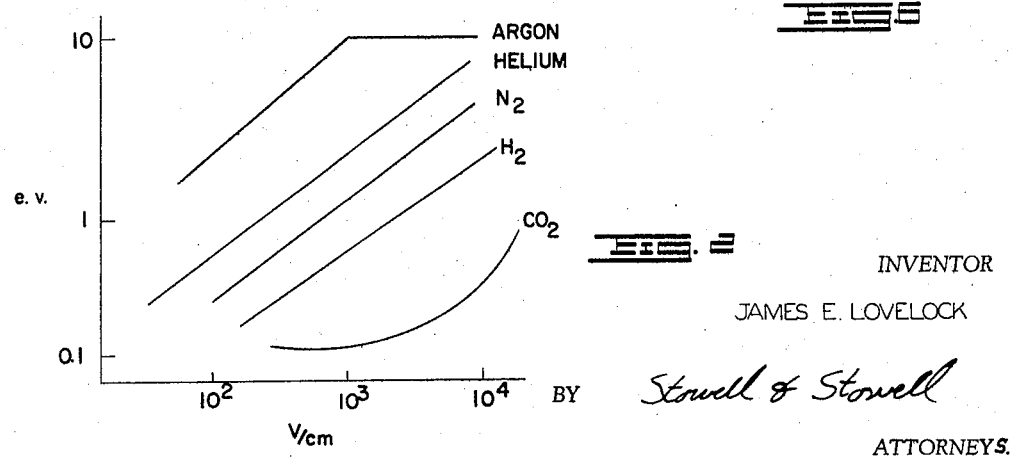
FIG. 4
INVENTOR
JAMES E. LOVELOCK
BY Stowell & Stowell
ATTORNEYS.

3,247,375
GAS ANALYSIS METHOD AND DEVICE FOR THE QUALITATIVE AND QUANTITATIVE ANALYSIS OF CLASSES OF ORGANIC VAPORS
James E. Lovelock, Church St., Bower Chalke, near Salisbury, Wilts, England
Filed Dec. 23, 1960, Ser. No. 78,044
6 Claims. (Cl. 250—43.5)

This invention relates to the analysis of gas mixtures, and more particularly to the qualitative identification of classes of organic compounds such as esters, ethers, ketones, alcohols, etc. contained in gaseous mixtures. Furthermore, the invention relates to the quantitative analysis of certain classes of organic compounds such as halogenated hydrocarbons.

For many purposes, it is desirable to have an automatic method for the successive quantitative and qualitative analysis of a gaseous mixture containing unknown components. Much activity has been exhibited recently in this field. Gas chromatography as an analytical method has recently stimulated the development of automatic ionization methods for quantitative gas analysis. Among those developed are the hydrogen flame ionization detector and the "argon" detector, both of which possess sensitivities and a range of response far exceeding any previously existing methods of quantitative analysis.

Although quantitative methods of analysis have been automated, suitable automatic qualitative methods are lacking. An ideal automatic analytical method would possess not only the ability to separate and measure the components of a gas, but also the ability of identifying each component as it is separated. Present methods of qualitative analysis require the laborious method of collecting and identifying each component by conventional methods as it is separated from the gaseous mixture.

The separating ability of chromatograph columns is greatest when the quantity of gaseous sample applied is small and the present trend, therefore, is towards the use of samples as small as one microgram or less. Manifestly, it is almost impossible to collect and identify qualitatively by conventional methods the desirable small quantities of samples to be used for automatic quantitative methods. Although the mass spectrometer is available for qualitative analysis, it is an expensive instrument and at present too insensitive for the latest techniques of gas chromatography.

An object of this invention is to provide an accurate method and means for the qualitative analysis of unknown gas mixtures which contain individual gas components as small as one microgram or less.

Another object of this invention is to provide an automatic method and means for the rapid qualitative analysis of unknown mixtures of classes of organic compounds in the gaseous or vapor state, by taking advantage of the electron affinities thereof, which will be explained more fully hereinafter.

A further object of this invention is to provide an automatic method and means for the quantitative analysis of gaseous chlorinated hydrocarbons.

A particular advantage of the invention is that it can readily be embodied in an instrument capable of being coupled with a gas separation device, e.g., a chromatograph column.

The specific nature of the invention, as well as other objects and advantages thereof, will clearly appear from a description of a preferred embodiment as shown in the accompanying drawings, in which:

FIGURE 1 is a graph showing the voltage-current relationships of an ionization chamber containing nitrogen and nitrogen containing various organic molecules in the gas phase;

FIGURE 2 is a graph showing the relationship between the energy of free electrons and the applied potential when various exemplary carrier gases are present in an ionization chamber;

FIGURE 3 illustrates one embodiment of a suitable ionization chamber 29 together with gas inlet, mixing, and exhaust means for carrying out the method of this invention;

FIGURE 6 shows a series of chromatographs obtained in a specific example of this invention disclosed herein.

Figure 4:
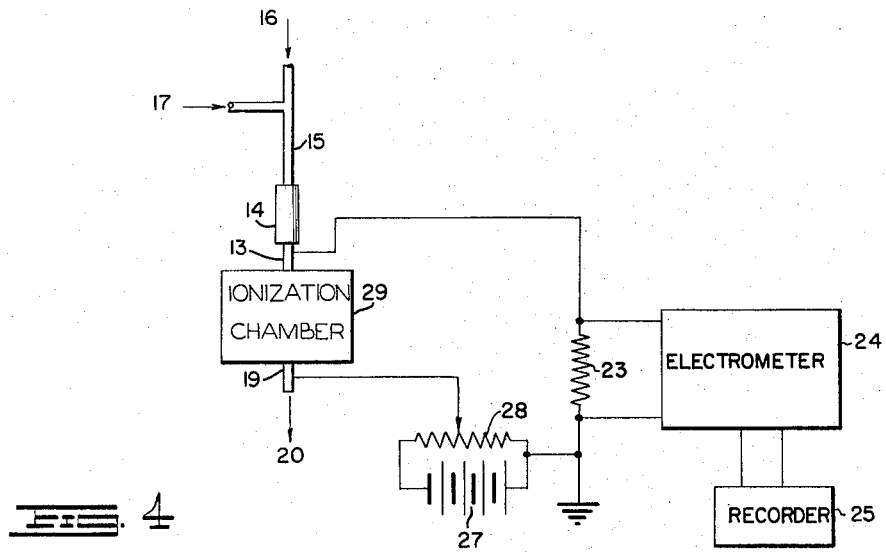
FIGURE 4 illustrates diagrammatically one specific embodiment of a suitable automatic apparatus for carrying out the method of this invention comprising an ionization chamber as is shown in FIGURE 3, and a schematic circuit diagram.

It is known that free electrons present in certain inert gases such as the rare gases and nitrogen are readily captured by the molecules of other gases and vapors also present to form molecular ions. The probability of capture of the free electrons depends on the energy of the free electrons and the affinity for electrons of the molecules concerned. In general, electrons with relatively high energies are not readily captured but those with energies below about 10 to 20 electron volts are captured by many classes of compounds. The probability of capture by the molecules by any given compound or class of compounds usually has a maximum at some fairly sharply defined electron energy.

In an ionized gas the negative charge carriers may be either free electrons or negative molecular ions. An important process leading to the formation of negative ions is the reversible reaction in which neutral molecules ($M°$) capture free electrons ($e^-$).

$$M° + e^- \rightleftharpoons M^- + \text{energy}$$

The energy liberated by the reaction or required to dissociate the negative ion is called the electron affinity of the molecule. Electron affinities of different molecular species vary over a wide spectrum of energy so that the electron affinity of a given compound is a property potentially useful in its characterization. However, the process described above for the reversible interaction between free electrons and neutral molecules is true only in a broad sense. The interaction of electrons with neutral molecules and the dissociation of negative ions are both complex processes and only rarely are the energies involved equivalent. From a practical standpoint, however, the measurement of apparent dissociation energies or apparent electron affinities is sufficient for the purposes of this invention.

With few exceptions, hydrocarbons have a weak affinity for free electrons. The inclusion of a functional group containing one or more atoms other than carbon or hydrogen, i.e., oxygen, nitrogen, sulfur, halogens, etc., frequently increases the electron affinity of the hydrocarbon molecule. Thus, when oxygen is present as in the case of ethers, alcohols, acids, ketones, peroxides, etc., the compounds have greater apparent electron affinities than the parent hydrocarbon. Under these circumstances, for example, the relative increase in apparent electron affinity depends on the nature of the chemical combination. If oxygen is firmly bound and non-reactive as in an ether linkage, the increase is small. In the case of relatively reactive peroxides, diketones, or acids, the increase in apparent affinity is large. Intermediate between these extremes are simple alcohols, ketones, esters, etc.

Generally, the electron affinity is determined principally by the predominant functional group present in the molecule particularly when this includes some atoms as stated other than carbon or hydrogen. In other words, the nature of the combination of the foreign atom (the functional group) in a hydrocarbon largely determines the absorption of electrons by a given compound. This is so since the effect (absorption of electrons) of the foreign atom in a hydrocarbon is much larger when compared with the hydrocarbon itself. For example, it was found that 25 different alcohols from methanol to docecanol all had the same electron affinity. The same was found to be the case with 32 different esters from methyl acetate to methyl linoleate. As with other methods of spectroscopy the distinction is not absolute. Some simple C, H, O compounds such as diacetyl absorb electrons as strongly as do halogenated compounds.

The measurement of electron affinities of compounds can be accomplished with preciseness using known relatively complex methods. However, as stated previously for the purposes of this invention, the measurement of the apparent electron affinity using simple methods is sufficient. A suitable method merely involves the use of an ionization chamber containing a source of ionizing radiation and a means for measuring the current which flows in the chamber at different applied potentials. To measure the apparent electron affinity of a given gas or vapor the current flow in the chamber at different applied potentials is observed; first when the chamber is filled with an inert gas and then with the same inert gas containing a small quantity of test vapor or gas.

The term, inert gas, for the purposes of this invention, is one which has a negligible affinity for free electrons, for example, hydrogen, nitrogen, $CO_2$, He and other noble gases, etc. Argon should not ordinarily be used since irradiation thereof produces metastable atoms which on collision with vapor molecules produce ions which offset the effects provided by electron capture. However, the use of argon as a carrier gas is not precluded since it may be feasible to arrange the electron detector and its operating parameters in such a manner that only free electrons come in contact with the organic molecules in the gas phase. Under these conditions argon may then be used as a carrier gas, thus providing the convenience of simultaneous qualitative analysis along with a quantitative analysis device using argon such as the "argon" detector mentioned heretofore. Furthermore, as will be described hereinafter argon may be used in the quantitative analysis of chlorinated hydrocarbons.

The voltage current relationships of an ionization chamber containing nitrogen and nitrogen contaminated with various vapors is illustrated in FIGURE 1. The potential required to reach saturation current in the chamber with only nitrogen present is relatively small (curve A). The potential required to reach saturation current with a vapor also present is higher, cf. curve B, a hydrocarbon; curve C, an ester; curve D, an alcohol; and curve E, a halogenated hydrocarbon.

The potential needed to establish the flow of a saturation current or some convenient portion of it will be related to the electron affinity of the gas within the chamber. For a given compound, the value of this potential will depend not only upon the electron affinity of the compound but also on the shape of the chamber and the temperature and pressure of the gas within it. The relative values for different compounds under constant conditions, however, will be consistent.

Since the probability of capture of a free electron by a given compound on collision will vary with the energy of the free electrons, the mean free electron energy in the ionization chamber can be controlled by both variations in the applied potential and by the choice of a suitable carrier gas. The choice of carrier gas from those mentioned is determined by the form or type of analysis to be made. Maximum sensitivity is provided by the heavier noble gases, i.e. argon, krypton, and xenon. The greatest available ranges of free electron energies are noted with helium, hydrogen, and nitrogen. The capture of free electrons at very low electron energies is readily achieved with carbon dioxide. The curves shown in FIGURE 2 enable one to select the proper carrier gas. Some compounds, e.g., $N_2O$, $H_2O$, etc. capture free electrons at relatively low electron energies. It may be difficult in hydrogen, nitrogen, or argon to obtain small electron energies by using low applied potentials. In carbon dioxide, however, low electron energies can be readily obtained.

Since the electron affinities of the various classes of organic compounds are different, this property or characteristic is used, in accordance with this invention, to identify an unknown class or classes of organic compounds contained in a gaseous mixture.

The ionization chamber 29 together with gas inlet, mixing, and exhaust means shown in FIGURE 3 comprises a Teflon body 10 enclosing a cylindrical chamber 11, one cm. in diameter by one cm. in length. Teflon is the Du Pont trade name of the polymer "polytetrafluorethylene." This material does not vary in composition but may vary from sample to sample in molecular weight and physical properties. The form most desired in practicing the invention is that which has the highest temperature stability, lowest conductivity, and greatest resistance to radiation. Acceptable forms of Teflon are readily available commercially. An anode 12 comprising a circular disc has an inlet opening 13 at its center. Attached to the inlet is a short length of Teflon tubing 14. A glass T-joint 15 is provided for introducing the carrier gas through inlet 16 and the unknown gas sample through inlet 17. A gas flow diffuser 22 is provided made from a 100-mesh wire gauze. A cathode 18 comprising a circular disc has an outlet opening 19 at its center and attached thereto a short length of Teflon tubing 20. A radiation source 21 is provided within the chamber and may comprise a metal foil coated with a suitable amount of radium D or strontium 90, etc.

In one specific embodiment of the invention, FIGURE 4, the ionization chamber is connected in an energizing circuit comprising a source of D.C. potential 27, a variable potentiometer 28, and a measuring resistor 23. It will be noted that by varying the position of the sliding contact of the potentiometer 28 that the voltage across the ionization chamber 10 may be varied. In order to measure the variations in current flowing through the ionization chamber, the potential developed across the resistor 23 is measured by the electrometer 24 and the signal automatically recorded by recorder 25, for example, in the form of a chromatogram.

Figure 5:
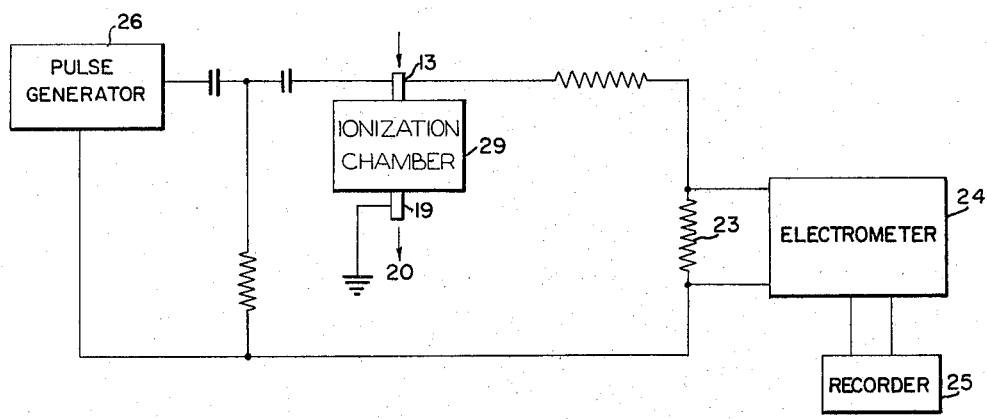
FIGURE 5 illustrates diagrammatically another embodiment of suitable automatic apparatus for carrying out the method of this invention wherein a pulse generator is used as the potential source.

In a further embodiment of the invention, FIGURE 5, a variation of the type of potential applied to the ionization chamber is shown. In this variation a pulse generator 26 is used with a conventional circuit. The generated D.C. pulse is applied across the electrodes of the ionization chamber. A suitable pulse generator supplies positive pulses of amplitude of about 50 to 150 volts and widths between about 0.5 and 10 microseconds. The interval between pulses should be approximately twice as long as the width of the pulse. It is simple and convenient to generate these pulses using a Class C oscillator which, with appropriate connections, well known in the art, supplies half wave rectified sine waves whose width is approximately ⅓ that of the total period of the oscillator. Again the signal obtained from the chamber is automatically recorded.

Calibration of the ionization chamber will be required at standard conditions in order that the invention may be consistently practical. Known compounds are passed through the cell and determinations are made to assign the various identifying values to each compound. Thus, a known alcohol sample is vaporized and passed through the chamber in a helium carrier gas. On each passage of the sample therethrough a constant voltage is applied to the chamber. The voltage is increased with each passage of the sample. At low applied potentials there is a decrease in current flow as the vapor enters the chamber. At higher potentials the negative response becomes less and will disappear at a definite applied voltage. At still higher applied potentials, the response becomes positive, i.e., there is an increase in current flowing in the chamber when vapor is present. The potential at which the transistion from a negative to a positive response occurs is a value which will characterize the alcohol sample and other types of alcohols. Similarly, the values of other major classes of organic compounds may be determined and used to characterize unknown components of gaseous mixtures. The values determined from the calibration are then used as identifying standards.

The following example will illustrate the method of the invention using an ionization chamber such as the one shown in FIGURE 3 and the automatic apparatus of FIGURE 4, which has been calibrated and for which a set of standards has been determined for the major classes of organic compounds in a helium carrier gas. The apparatus is calibrated as follows: A mixture of several members of one class of organic compounds, e.g., hydrocarbons, alcohols, ketones, etc., is made and the quantities of each component member in the mixture preferably made equal. A series of different sized additions of each mixture is applied to the apparatus, including a column capable of separating each member, at a series of chosen applied potentials. The range of potential over which the ion current changes from an increase in the presence of the vapor to a decrease is observed and recorded as characteristic of the member class. Generally the more electron absorbing the vapor the higher the potential required to prevent a decrease in current in its presence. The apparatus of FIGURE 3 was used with a chromatograph column.

The unknown sample containing a mixture of gas and vapor components was passed through the chromatograph column and the components were serially eluted in a stream of helium carrier gas. The eluted components were serially introduced into the ionization chamber to which a potential of 2 volts was applied. The signal response was recorded on the potentiometric recorder and a chromatogram obtained. The same mixture of components was repeatedly passed through the chromatograph column and the ionization chamber. The potential applied was increased with each passage of values of 5, 7, 10, and 20 volts. Upon each passage a chromatogram was obtained and the several chromatograms obtained are shown in FIGURE 6.

From the series of chromatograms it is seen that at 2 volts all the peaks on the recorder base line are negative. A negative peak implies that a decrease in ion current accompanies the presence of vapor in the chamber. As the potential is increased the probability of the loss of charge carriers, by electron attachment or recombination in the chamber, becomes less and the negative peak lessens and finally disappears. At five volts, the negative peak for the unknown compound Z had disappeared, thus indicating that the unknown would be identifiable from the standards between 2 and 5 volts. Upon reference to the set of standards, it was noted the compound Z was a cyclic hydrocarbon.

At seven volts, the chromatograms show that the negative peak for compound X disappeared. Reference to the standards disclosed that the unknown compound X was an aromatic compound.

At ten volts it is noted that the negative peak of the unknown compound V disappeared and the negative peak of the unknown compound U disappeared and emerged as a small positive peak. Reference to the standards disclosed that compound U was an ether, and compound V was an ester.

Similarly, the unknown compounds S and T were determined by a reading of the chromatogram at 20 volts to be an alcohol, and a ketone, respectively. Furthermore, the negative peak for R was found to disappear at higher voltages and identified as air.

Some indication of the particular compound present may be gleaned from the retention time of the negative peaks. The retention time of the components in the chromatograms of FIG. 6 is measured in arbitrary units by the horizontal distance, left to right, between the first air peak R which has zero retention and the component peak to be defined. In practice this time can be measured with a high degree of accuracy. The relative times of emergence of members of a homologous series of compounds from a chromatograph column is a characteristic property for each member of the series. The time of emergence (called the retention time) is frequently related closely to the molecular weight of the compound. It is valuable in the identification of an unknown compound and the value is greatly enhanced when in addition information on the probable class of compound is also available; such as from the present invention. Thus in the above example, it was determined at higher applied potentials than 20 volts that compounds F and H were chlorinated hydrocarbons. Compound H retained a negative peak to a higher potential than compound F. From this it can be shown from previous calibration and information that compound H had a higher degree of chlorination than compound F.

Generally, it was found with halogenated hydrocarbons that absorption of electrons increases with increased halogenation. In addition, the absorption of electrons is increasingly greater with halogens in the following order: fluorine, chlorine, bromine, and iodine.

A suitable source of ionizing radiation for use in the ionization chamber is radium D or strontium 90. Suitable materials are those commercially available in which the radioactive material is firmly bonded into a strip of silver foil so that there is no danger of escape of radioactive material. The source may contain about 10 to 1000 microcuries of an alpha emitting element or 1 to 100 millicuries of a beta emitting element. Although the source of free electrons may be the ionizing radiation already described, other suitable sources are also contemplated, e.g. a cathodic emitter may be used.

It was observed that the measurement of the voltages in the identification of the unknown classes of compounds in accordance with this invention varied slightly with both vapor concentration and the carrier gas used but was sufficiently constant for the characterization of the major classes of compounds.

In the practice of this invention, one skilled in the art would also have available other information to aid him in his qualitative identification of the unknown compounds. Thus, if the unknown gaseous mixture had been passed through a chromatograph column or subjected to a flame ionization or thermal conductivity test, some information would be available with respect to molecular weight, boiling point, relative percentages, etc. In addition the time factor on the chromatograms obtained as discussed heretofore would give an indication of the molecular weight of the compound.

In addition to the uses described heretofore for the present invention, it is contemplated that the methods and apparatus comprising the invention be used in the fields of microwave detection, leak detection, and in rectification. Thus, as a microwave detector the ionization chamber described above could be used in the absorption of microwave or radio frequencies since the absorption depends upon electron density. The greater the electron density the greater the absorption and the chamber becomes a resonant cavity.

As stated previously, the invention is also applicable to the quantitative determination of chlorinated hydrocarbons. The steps for the quantitative determination of chlorinated hydrocarbons and any substance detectable by the electron capture method are as follows:

A detector and its associated amplifier and recording equipment is connected to a source of potential and to a chromatography column which in turn is connected to a supply of carrier gas. A test sample of the substance to be analyzed is applied to the column and when the substance emerges from the column the detector potential is adjusted to a value convenient for measurement. (If analysis is to be made with very small quantities a low potential is needed and vice versa.) A known quantity of a mixture containing a known amount of substance to be analyzed is applied to the column. The area of the peak drawn on the recorder by the emergence of the test substance through the detector is then measured. The mixture containing an unknown amount of the substance is then applied to the column. The ratio of the peak area from this analysis to that given by the known amount provides the proportion of the test substance in the unknown mixture. In measurements of this type it is important to insure that the current flow in the detector does not decrease in the presence of the test substance by more than about ten percent. Measurements can be made with a greater decrease in current but it is then necessary to calibrate the response of the detector to increasing known quantities of test substance. With samples large enough to reduce the detector current to more than 90 percent of the current with pure carrier gas, the response is no longer directly related to vapor concentration but takes the form $$I = I_0 e^{-(KC)}$$

where I is the observed current in the presence of test vapor,
where $I_0$ is the current with pure carrier gas,
where C is the vapor concentration, and
where K is a constant.

It will be apparent that the embodiments shown are only exemplary and that various modifications can be made within the scope of the invention as defined in the appended claims.

I claim:

1. A method for the analytical determination of vaporizable organic chemical substances which comprises passing the substance in vapor form in an inert carrier gas between the opposed electrodes of an ionization chamber, exposing the stream of combined carrier gas and vapor to radiation of a predetermined value sufficient to ionize the gas and provide saturation currents promoting free electron capture at low electron energy levels while passing between the electrodes, applying predetermined unidirectional potentials across the electrodes and measuring and recording the relative current carried by ionization-formed negative ions through said chamber in response to the application of said potentials.

2. A method for the analytical determination of vaporizable organic chemical substances which comprises passing the substance in vapor form in an inert carrier gas between the opposed electrodes of an ionization chamber, exposing the stream of combined carrier gas and vapor to radiation of a predetermined value sufficient to ionize the gas and provide saturation currents promoting free electron capture at low electron energy levels while passing between the electrodes, applying predetermined unidirectional potentials of successively varying voltages across the electrodes and measuring and recording the relative current carried by ionization-formed negative ions through said chamber in response to the application of said potentials.

3. A method for the analytical determination of the components of a mixture of organic compounds, which comprises separating said mixture into its components by gas chromatography and passing the serially eluted chromatographic fractions in a carrier stream of inert gas between the opposed electrodes of an ionization chamber, exposing the stream of combined carrier gas and eluted fractional components to radiation of a predetermined value sufficient to ionize the gas and provide saturation currents promoting free electron capture at low electron energy levels while passing between the electrodes, applying predetermined unidirectional potentials across the electrodes and measuring and recording the relative current carried by ionization-formed negative ions through said chamber in response to the application of said potentials.

4. A method for the analytical determination of the components of a mixture of organic compounds, which comprises separating said mixture into its components by gas chromatography and passing the serially eluted chromatographic fractions in a carrier stream of inert gas between the opposed electrodes of an ionization chamber, exposing the stream of combined carrier gas and eluted fractional components to radiation of a predetermined value sufficient to ionize the gas and provide saturation currents promoting free electron capture at low electron energy levels while passing between the electrodes, applying predetermined unidirectional potentials of successively varying voltages across the electrodes and measuring and recording the relative current carried by ionization-formed negative ions through said chamber in response to the application of said potentials.

5. Apparatus for the analytical determination of vaporizable organic chemical substances comprising an ionization chamber including spaced electrodes, inlet and outlet means for passing a stream of combined inert carrier gas and vapor through said chamber between the electrodes, a source of radiation within said chamber of a predetermined value sufficient to ionize the gas and provide saturation currents promoting free electron capture at low electron energy levels, a source of unidirectional potential, and circuit elements connected across said spaced electrodes for applying predetermined unidirectional potentials from said source thereto, said circuit elements including current measuring means for measuring relative electrical current carried by ionization-formed negative ions.

6. Apparatus for the analytical determination of vaporizable organic chemical substances comprising an ionization chamber including spaced electrodes, inlet and outlet means for passing a stream of combined inert carrier gas and vapor through said chamber between the electrodes, a source of radiation within said chamber of a predetermined value sufficient to ionize the gas and provide saturation currents promoting free electron capture at low electron energy levels, a source of unidirectional potential, and circuit elements including a pulse generator connected across said spaced electrodes for applying predetermined unidirectional pulse potentials derived from said source thereto, said circuit elements including current measuring means for measuring relative electrical current carried by ionization-formed negative ions.

References Cited by the Examiner

UNITED STATES PATENTS

| | | | |
|---|---|---|---|
| 2,740,894 | 4/1956 | Deisler et al. | |
| 2,742,574 | 4/1956 | Weisz | 250—43.5 |
| 2,950,387 | 8/1960 | Brubaker | 250—41.9 |
| 2,959,677 | 11/1960 | Robinson et al. | |
| 2,968,730 | 1/1961 | Morris et al. | 250—43.5 |
| 3,009,096 | 11/1961 | Vanderschmidt. | |
| 3,009,098 | 11/1961 | Simons | 324—33 |
| 3,018,435 | 1/1962 | Vanderschmidt | 324—33 |
| 3,046,396 | 7/1962 | Lovelock | 250—43.5 |
| 3,087,112 | 4/1963 | Pfefferle | 324—33 |

FREDERICK M. STRADER, *Primary Examiner.*

LLOYD McCOLLUM, *Examiner.*